Nov. 28, 1961     J. D. MEADOR     3,011,004
THERMOCOUPLE DESIGN
Filed April 19, 1960     4 Sheets—Sheet 1
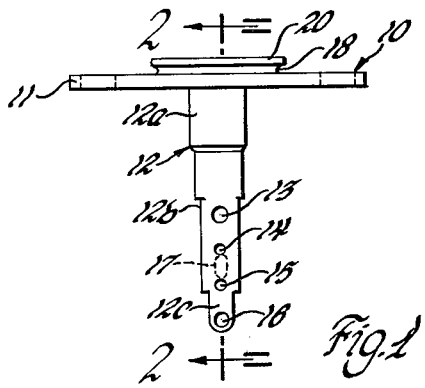
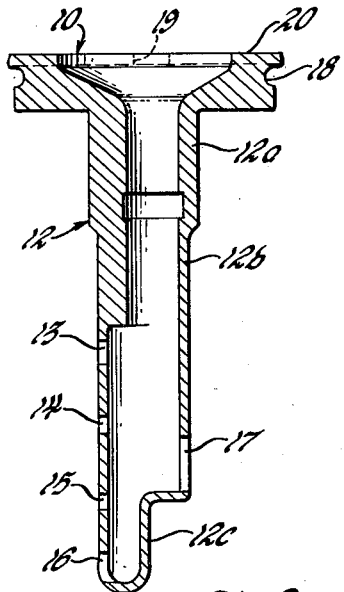
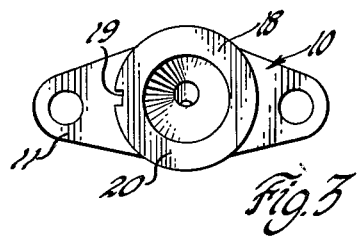
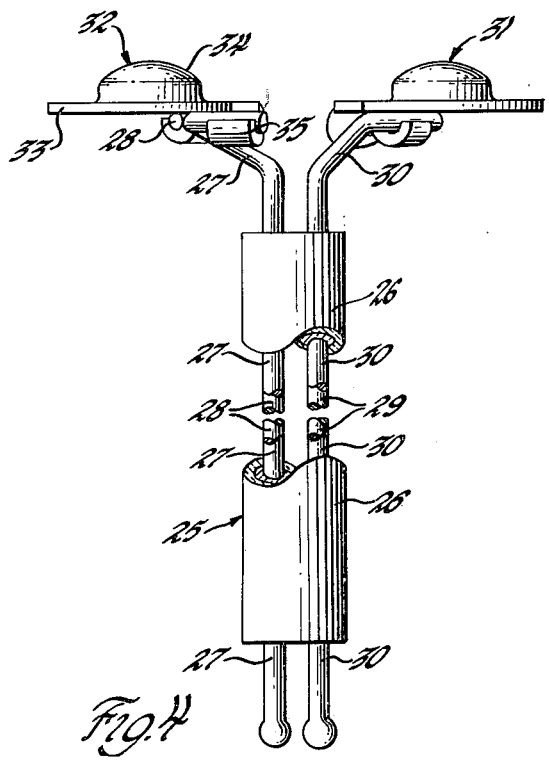
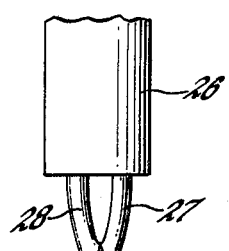
INVENTOR.
Jay D. Meador
BY
C. L. Spencer
ATTORNEY

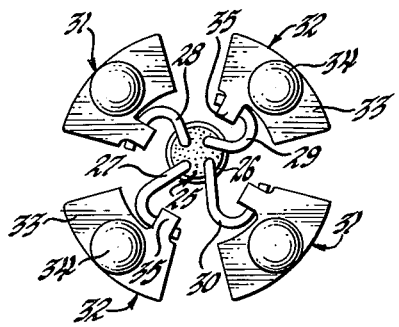
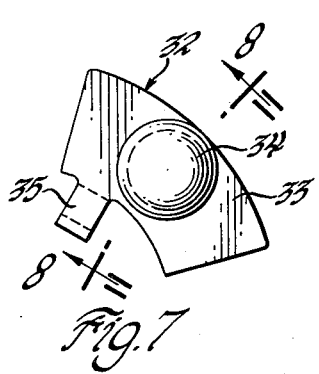
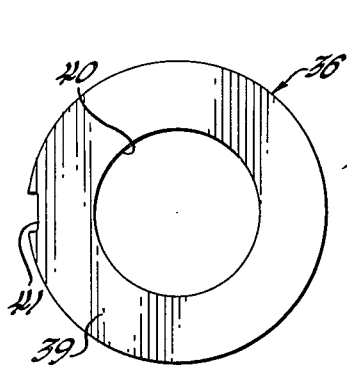
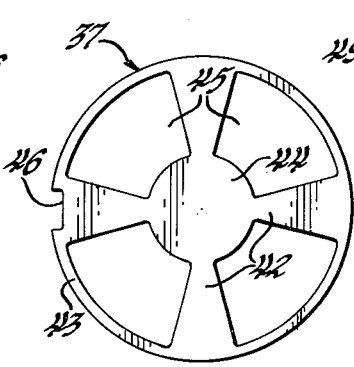
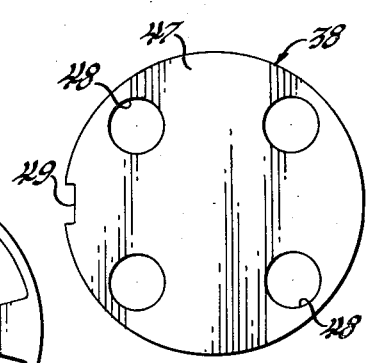
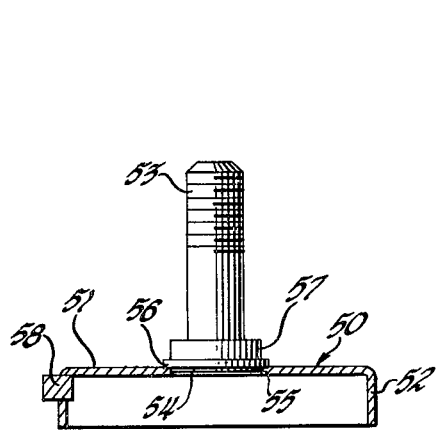
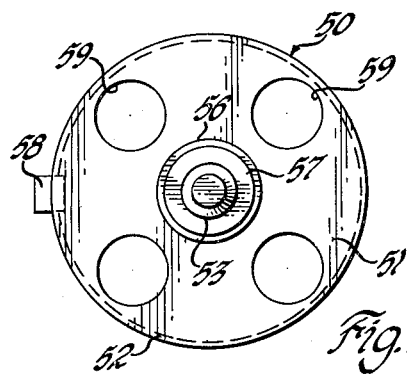

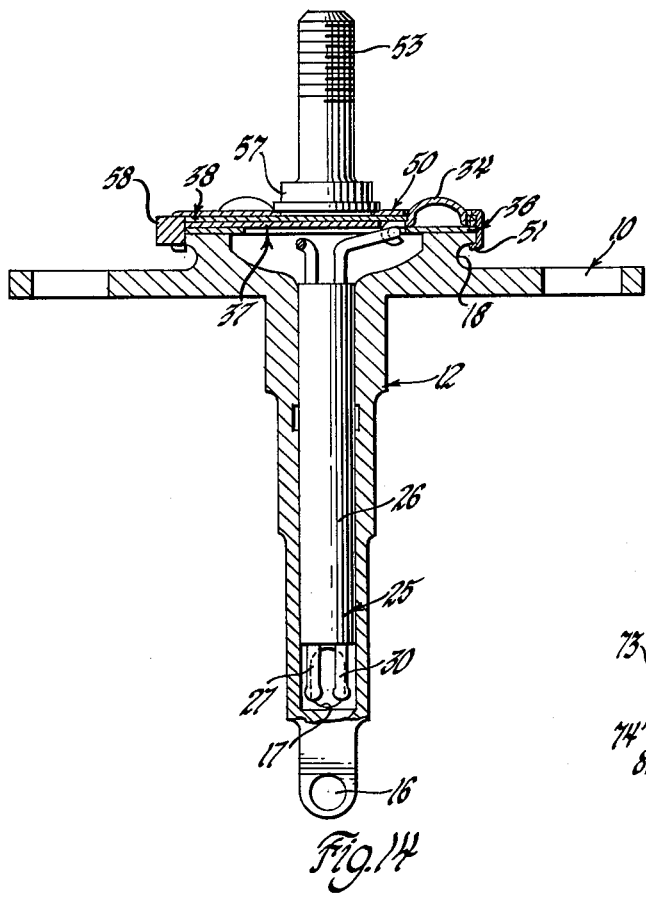

Nov. 28, 1961 J. D. MEADOR 3,011,004
THERMOCOUPLE DESIGN
Filed April 19, 1960 4 Sheets-Sheet 4

INVENTOR.
Jay D. Meador
BY
R. L. Spencer
ATTORNEY 3,011,004
THERMOCOUPLE DESIGN
Jay D. Meador, Indianapolis, Ind., assignor to General Motors Corporation, Detroit, Mich., a corporation of Delaware
Filed Apr. 19, 1960, Ser. No. 23,287
10 Claims. (Cl. 136—4)

This invention relates to thermocouples and more particularly to a thermocouple designed to measure the temperature of hot gases passing through a conduit such as for example, the turbine section of a gas turbine engine.

An object of this invention is to provide a thermocouple particularly adapted for high quality performance and particularly adapted for low cost large scale production.

Another object of this invention is to provide a thermocouple incorporating sub-assemblies of low-cost parts into a complete unit which may be quickly and economically assembled in large scale production.

A further object of this invention is to provide a thermocouple incorporating button-contact termination between a thermocouple subassembly and a wiring harness to facilitate servicing without disrupting the wiring connections to the wiring harness.

An additional object of this invention is to provide a thermocouple in which the detail parts of the thermocouple assembly and cover assembly, which is an integral part of the wiring harness, are aligned by means of a single key element that is integral with the thermocouple shell assembly.

These and other objects and advantages of this invention will be apparent from the following description and claims, taken in conjunction with the accompanying drawings in which:

FIGURE 1 is a front elevation of a cast metal probe adapted to be inserted into a chamber containing hot gas.

FIGURE 2 is a sectional view taken along the line 2—2 of FIGURE 1.

FIGURE 3 is a top plan view of the probe shown in FIGURE 1.

FIGURE 4 is a front elevational of a sub-assembly of an electric wiring probe and contact adapted to be assembled to the cast probe of FIGURE 1, with certain parts broken away.

FIGURE 5 is a side view of the lower portion of FIGURE 4 illustrating the junction of certain wires at the bottom of the probe.

FIGURE 6 is a top plan view of FIGURE 4.

FIGURE 7 is a top plan view of one of the four similarly shaped electric terminals shown in FIGURE 4.

FIGURE 8 is a sectional view taken along the line 8—8 of FIGURE 7.

FIGURE 9 is a top plan view of a mica insulator.

FIGURE 10 is a top plan view of a second mica insulator.

FIGURE 11 is a top plan view of a third mica insulator.

FIGURE 12 is a partial sectional view through a shell assembly.

FIGURE 13 is a top plan view of the shell assembly of FIGURE 12.

FIGURE 14 is a sectional view through a sub-assembly including the cast metal probe, the wiring and contact sub-assembly and the shell assembly.

FIGURE 15 is a sectional view through a pressure contact spring assembly taken along the line 15—15 of FIGURE 17.

FIGURE 16 is a top plan view of the contact spring of FIGURE 15.

FIGURE 17 is a top plan view of the spring and terminals shown in FIGURE 15.

Figure 18:
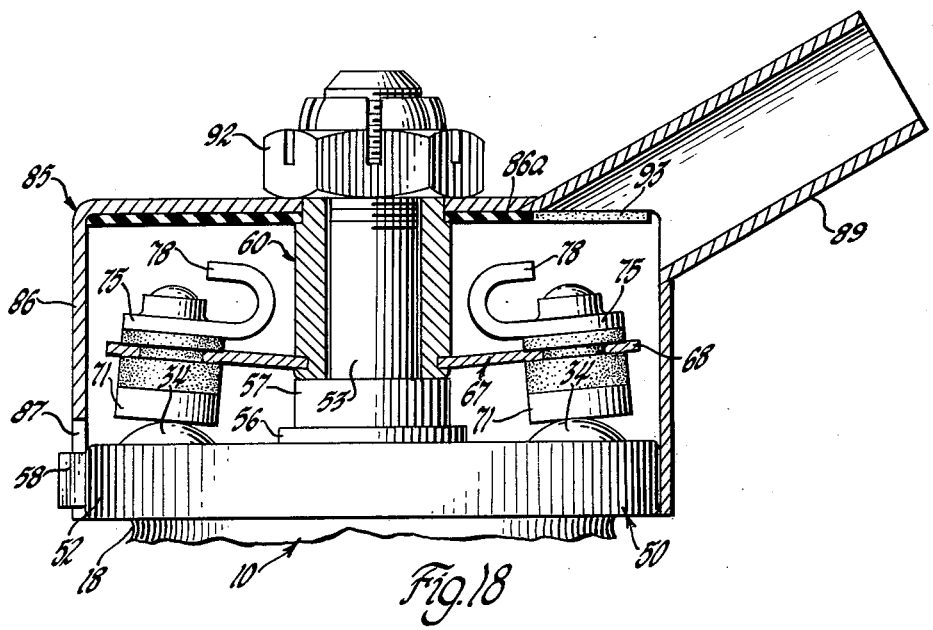
FIGURE 18 is a sectional view of a cover assembly illustrating cover and terminals mounted upon the shell assembly.

The thermocouple constructed in accordance with the principles of this invention consists of a final assembly of a series of sub-assemblies including a thermocouple assembly, a shell assembly, a spring assembly, and a cover assembly.

The thermocouple assembly consists of a cast metal probe 10, shown in FIGURES 1 and 2 into which a probe and contact assembly 25 shown in FIGURE 4 is inserted. The thermocouple is used particularly to measure the temperature of a gas stream flowing at high velocities as in a gas turbine, and probe 10 is particularly designed to measure the average temperature of gases at a plurality of points in the path of a gas stream. The thermocouple probe 10 is also designed to sample equal quantities of gases from a plurality of points in the gas stream and to direct these quantities in a concentrated flow past a thermocouple junction. Probe 10 includes a mounting bracket 11 by which the probe may be mounted upon the external surface or wall of a gas duct of a conventional gas turbine engine (not shown) with the probe extending into the path of travel of hot gas. A collector tube 12 formed of a suitable casting has a relatively large circular portion 12a reduced to an ovate portion 12b and a smaller terminal portion 12c. Probe 10 has a plurality of spaced upstream gas inlet openings 13, 14, 15 and 16 and a single slotted downstream opening 17.

As shown in FIGURE 3, mounting bracket 11 is provided with a raised annular boss 18 having a single square slot 19 formed therein for purposes hereafter more fully explained. The raised boss 18 also provides a flat annular surface 20 for purposes hereafter more fully explained. Opening 17 is disposed between openings 14 and 15 as shown in FIGURES 1 and 2, so that gas passing through probe 10 and entering through the different inlet passages will be mixed before passing through outlet 17.

A probe and electrical contact assembly indicated generally at 25 in FIGURE 4 is made up of a cylindrical tube 26 through which a plurality of dissimilar wires 27, 28, 29 and 30 extend, the tube being filled with suitable insulating material such as magnesium oxide. Wires 27 and 29 are preferably Chromel, while wires 28 and 30 are Alumel. With the probe and contact assembly 25 position in probe 10, a space is provided between the exterior surface of tube 26 and the internal surface of the ovate portion 12b of probe 10 to permit the hot gases to travel from intake openings 13, 14, 15 and 16 to outlet 17. As shown in FIGURE 6, the upper ends of the wires 27, 28, 29 and 30 are bent over and fanned out to lie in a common plane. Wires 28 and 30 each have secured thereto an electrical contact 31 stamped of Alumel, while the wires 27 and 29 each have an electrical contact 32 secured thereto and formed of a stamping of Chromel. The electrical contacts are all of similar configuration and may be formed by a common die. The bottom ends of dissimilar wires 27 and 28 are welded together as shown in FIGURE 5, and the bottom ends of wires 29 and 30 are similarly welded to each other. Details of one of the two similar electrical contacts 32 are shown in FIGURES 7 and 8. As shown, the contact 32 is formed of a sheet metal stamping to provide an arcuate shaped flat base surface 33 having a raised button 34 formed therein and a bent over U-shaped tang 35 formed thereon. As shown in FIGURES 4 and 6, one end of each of the wires is disposed in the U-shaped tang provided to receive the wire and wire is then welded to the tang for good electrical contact.

Three mica insulators indicated generally at 36, 37 and 38 in FIGURE 14 are shown in detail in FIGURES 9, 10 and 11. As shown in FIGURE 9, insulator 36 is in the shape of a washer having a flat surface 39, a circular opening 40, and a recess 41 on the rim of surface 39. As shown in FIGURE 10, insulator 37 is cut to provide a series of webs 42 joining a circular rim 43 to a center member 44 and to provide a series of four spaced windows or openings 45 between the webs 42, rim 43, and center portion 44. Rim 43 is provided with a recess at 46. The insulator 38 shown in detail in FIGURE 11 comprises a disc 47 having four openings 48 formed therethrough and a recess 49 on the rim of the disc. The three insulators 36, 37 and 38 are shown in assembled relationship in FIGURE 14. Insulator 36 is disposed on flat surface 20 of probe 10 with surface 39 disposed beneath the electrical contact buttons. Center opening 40 in insulator 36 provides a space to receive the laterally extending bent over tangs 35 formed on the contact buttons. In the assembling operation, the buttons 34 and surface 33 are seated upon the insulator 36 with the tangs 35 and the wires secured thereto disposed in the opening 40. Insulator 37 is then disposed on top of insulator 36, the openings 45 of insulator 37 being shaped to receive the fanned out base of the contacts 32, and to permit the buttons 34 to extend upwardly through the openings. Insulator 38 is then disposed on top of insulator 37 with the openings 48 coinciding with the buttons 34 so that buttons 34 extend upwardly through the opening 48. The insulators, in addition to insulating function serve to positively position the contacts in the assembly. The flat surfaces 33 of the contacts 32 fit into the openings 45 so that insulator 45 serves as a retainer to positively position the contacts in the assembly.

A shell assembly indicated generally at 50 and shown in detail in FIGURES 12 and 13 is disposed over the probe assembly heretofore described. Shell assembly 50 is composed of a cup shaped sheet metal stamping 51 having a downwardly depending rim 52 and an upstanding center post 53 threaded at its outer end. The base of the cup 50 is cut out to provide a central circular opening 55 adapted to receive one end 54 of post 53. An enlarged boss 56 on post 53 overlies the base of cup 50 adjacent opening 55 and is welded to the base. A second boss 57 of greater diameter than the diameter of post 53 is provided on the post adjacent boss 56. A key 58 is carried by the rim 52 and the base 51 is provided with four equally spaced openings 59 through which the upper portions of the buttons 34 extend. In the completed assembly, the bottom portion of rim 52 is bent over as shown in FIGURE 14 to grip the boss 18 on probe 10 to retain the mechanism in assembled relationship.

The provision of the slots 41, 46 and 49 on the rims of insulators 36, 37 and 38 and the key 58 on rim 52 assures proper assembly of these parts such that the openings provided in the insulators and in the base 51 of cup member 50 will be in proper alignment with each other to receive the electrical contact. This facilitates speedy assembly of the parts and prevents breakage of the insulators as might otherwise occur were not the openings placed in proper alignment. The key and slot arrangement provides for automatic alignment of the button receiving openings and positively prevents improper assembly. With the key 58 disposed in the slots, the contact receiving openings are automatically disposed in alignment with each other, and the contacts are properly positioned in the assembly.

Center post 53 of the shell assembly is adapted to receive a spacer member 60 shown in FIGURE 15, the spacer 60 comprising a cylinder 61 having stepped recesses 62 and 63 on its outer surface adjacent the opposite ends of the cylinder. A thermocouple contact spring 67 is disposed over recessed portion 63 into contact with a shoulder 64 and the end of spacer 60 is spun outwardly at 66 to retain spring 67 on spacer 60. A shoulder 65 is provided by recessed portion 62. Contact spring 67 is composed of sheet metal shaped to provide four arms 68 shown in FIGURE 16 and provided with a central opening 69 adapted to receive recessed portion 63 of spacer member 60 and four equally spaced openings 70 adapted to receive electrical contacts as hereafter described. All four electrical contacts and the terminals associated therewith are of similar configuration and accordingly only one will be described. The cruciform shape of spring 67 is provided to insure adequate deflection of the spring and to reduce stock tolerance problems in the assembly.

Referring to FIGURE 15, there is shown an electrical contact 80 formed in the shape of a flat headed rivet extending through opening 70 of spring 68 and adapted to receive a pair of mica insulators 73 and 74 and an electrical terminal 81. Insulator 73 is disposed between the head of contact 80 and spring 68. Insulator 74 is disposed between the base of terminal 81 and disc 68, the insulator 74 having an extension positioned in opening 70 in spring 68. After the contact 80 has been assembled to the terminal, insulators, and the spring, the bottom of the contact is peened over and tack welded at 77 to retain the parts in assembled relationship as shown in FIGURE 14.

As shown in FIGURES 15 and 17, there are two sets of contacts 71 having terminals 75 and two sets of contacts 80 having terminals 81 carried by spring 68. Each terminal is formed of a sheet metal stamping having a pair of bent over U-shaped tangs 78 adapted to receive wires, not shown. In the assembly, the set of contacts 71 and terminals 75 carried thereby are each formed of Alumel while the sets of contacts 80 and terminals 81 carried thereby are each formed of Chromel. In the assembly of the spacer 60 to post 53, the Chromel contacts are disposed in contact with the Chromel buttons heretofore described and the Alumel contacts are disposed in contact with the Alumel buttons.

Figure 19:
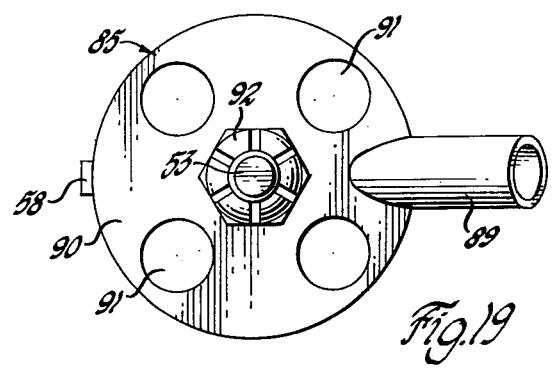
FIGURE 19 is a top plan view of the cover.
Figure 20:
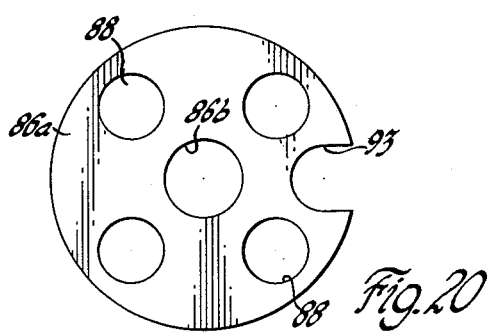
FIGURE 20 is a top plan view of an insulator.

A cup-shaped cover assembly 85 shown in FIGURES 18 and 19 is assembled to spacer 60 to protect the buttons 34, contacts 71, and terminals 75 from damage and foreign matter. As shown, the depending annular flange 86 on cover 85 is slotted at 87 to receive key 58 on the shell assembly so that the cover may be quickly and simply assembled in its proper position with respect to the thermocouple assembly. A disc shaped mica insulator 86a shown in FIGURE 20 is provided with a central opening 86b adapted to fit over the recessed portion 62 of spacer 60 and to contact shoulder 65 of spacer 60. Four equally spaced inspection holes 88 extend through insulator 86a as shown in FIGURE 20. Insulator 86a is cut out at 93 to permit a wiring harness, not shown, to pass through the insulator. Cover 85 has fixed thereto an outlet tube 89 through which a wiring harness (not shown) connected to the terminals 75 and 81 may extend for connection to a suitable galvanometer (not shown) or other instrument capable of reading the voltage induced in the thermocouple. After the cover 85 has been assembled to spacer 60, the cover may be welded to the spacer. As shown in FIGURE 19, four equally spaced inspection holes 91 are formed in the surface 90 of the cover. These holes are placed in alignment with openings 88 in insulator 86a when the cover is assembled to the shell assembly. A nut 92 on the threaded portion of post 53 may be tightened down on cover 85 and spacer 60 to move spacer 60 inwardly on post 53 to thereby place the spring disc 67 under tension. This provides good electrical contact between the contacts carried by spring 67 and the button portions 34 of contacts 32. In the absence of tension applied to spacer 60, the spring 67 will extend outwardly at right angles to the spacer as shown in FIGURE 15. In FIGURE 18, the spacer 60 is placed under tension by nut 92 so that the contacts 71 riding on buttons 34 cause the spring to bend as shown.

It will be apparent that the thermocouple is designed of individual parts which are inexpensive to manufacture and that the various subassemblies are particularly arranged for low cost high volume production. The final assembly of the cover, the shell assembly, the disc mica insulators and the buttons can only be assembled in the proper position in the assembly because of the key and slot arrangement described.

It will readily be understood that the afore-described thermocouple is particularly designed to attain high quality performance and is particularly suitable for high quantity low cost production. The design incorporates button contact termination and features detail parts that are simple and inexpensive stampings. The detail parts of the thermocouple assembly and cover assembly, which is an integral part of the thermocouple wiring harness, are aligned by means of a single key that is a part of the thermocouple shell assembly. The tension applied to the terminal contacts and buttons may be adjusted as desired. In the event that the wire probe assembly in the thermocouple should fail for any reason, the cover and wiring harness may be simply and quickly removed without upsetting the wiring harness connections to facilitate service or replacement of the wire probe. The buttons are retained in their proper position in the assembly by means of the three disc-type insulators. The side walls of the webs 42 of insulator 37 grip the base 33 of the contacts 32 to positively position the contacts in their proper predetermined position in the assembly. The key 58 of the shell assembly cooperates with the slots in the insulators and the slot in the cover to position the insulators and the cover in their proper predetermined position in the assembly. The nut on the shell assembly post retains the cover 85 and spacer 60 in assembled relationship. When nut 92 is fully tightened upon post 53, spring 67 is automatically tensioned to a predetermined value to prevent over-stressing of the spring and at the same time to provide adequate contact pressure. The tension of spring 67 is predetermined by dimensioning the height of boss 57 and locating the contact surface 71 in a predetermined position with respect to the inner end of spacer 60. Contact surfaces 71 are ground to establish thin assembled location with respect to the inner end of spacer tube 60 and boss 57 is machined to establish its required height with respect to buttons 34. The design whereby spring 67 is automatically stressed to a predetermined amount and cannot be overstressed in the assembly of the device is an important feature of this invention. The arrangement automatically prevents spring damage and at the same time insures proper electrical contact between the buttons and contacts.

I claim:

1. A thermocouple comprising an outer probe adapted to be disposed through the wall of a gas duct, openings in said outer probe for permitting heated gas to pass therethrough, thermocouple wires disposed in said probe and supported in insulated relationship with respect to said probe, said wires being joined to each other within said probe and subject to heated gas within said probe, a shell assembly comprising a cup shaped member having an upstanding post thereon and secured to said probe, an electrical contact member secured to each of said wires and extending outwardly through said shell assembly, a spacer member carried by said post, a spring carried by said spacer member, electrical contacts carried by said spring and disposed in physical contact with said first-mentioned electrical contacts, and terminal members carried by said spring electrically connected to said last-mentioned contacts and adapted to be connected to a wiring harness.

2. A thermocouple comprising a probe adapted to be disposed through the wall of a gas duct, openings in said probe for permitting entrance and exit of heated gas to and from said probe, thermocouple wires disposed in said probe and supported in insulated relationship with respect to said probe, said wires being joined to each other within said probe, a shell assembly comprising a cup-shaped member having an upstanding post thereon, said shell assembly being mounted upon said probe, a series of openings through said shell assembly, an electrical contact secured to each of said wires, said contacts being insulated from said shell assembly and having a portion thereof extending through said openings, a spacer member supported upon said post, a spring carried by said spacer member, contacts carried by said spring and disposed in physical contact with said first-mentioned contacts, terminal members carried by said spring electrically connected to the contacts carried by said spring and adapted to receive a wiring harness, said terminals and connecting members carried by said spring being electrically insulated from said spring.

3. A thermocouple comprising a probe adapted to be disposed through the wall of a gas duct, openings in said probe for permitting entrance and exit of heated gas to and from said probe, thermocouple wires disposed in said probe and supported in insulated relationship with respect to said probe, said wires being joined to each other within said probe, a shell assembly comprising a cup shaped member having an upstanding post thereon, said shell assembly being mounted on said probe, an electrical contact secured to each of said wires, an insulator having a central opening therein, said insulator being disposed between said contacts and said probe and forming a seat for said contacts, additional insulators for positioning said contacts in proper assembled relationship and having openings therethrough, said contacts having a portion thereof extending through said openings in said additional insulators, openings in said cup shaped member, said contacts having a portion extending outwardly through said openings, a spacer carried by said post, a spring mounted upon said spacer, contacts carried by said spring, insulation between said spring and said last mentioned contacts, terminal members electrically connected to said last-mentioned contacts and adapted to be secured to a wiring harness, said spring supported contacts being disposed in physical contact with the contacts extending through said shell assembly openings.

4. A thermocouple comprising a probe adapted to be disposed through the wall of a gas duct, thermocouple wires disposed in said probe and supported in insulated relationship with respect to said probe, said wires being joined to each other within said probe, a shell assembly comprising a cup-shaped member mounted on said probe and having an upstanding post thereon, an electrical contact secured to each of said wires, an insulator having an opening therein through which said wires extend, said insulator being disposed in said shell assembly between said contacts and said probe and forming a seat for said contacts, additional insulators in said shell assembly for positioning said contacts in said shell assembly, openings in said additional insulators and said cup shaped member disposed in registry with each other, said contacts being formed with a raised portion extending outwardly through said openings, a spacer member supported upon said post, a spring carried by said spacer member, electrical contacts electrically connected to terminal members carried by said spring and electrically insulated from said spring, said terminal members being adapted to be connected to a wiring harness, and said spring supported contacts being disposed in physical contact with said first-mentioned contacts.

5. A thermocouple comprising a probe adapted to be disposed through the wall of a gas duct, thermocouple wires disposed in said probe and supported in insulated relationship with respect to said probe, said wires being joined to each other within said probe, a shell assembly comprising a cup-shaped member mounted on said probe and having an upstanding post thereon, an electrical contact secured to each of said wires, an insulator having an opening therethrough through which said wires extend, said insulator being disposed in said shell assembly between said contacts and said probe and forming a seat for said contacts, a slot in said insulator, a second insulator having openings therein the edges of which grip said contact members to retain said contact members in a predetermined position in the assembly, a slot in said insulator, a key fixed to said cup-shaped member of said shell assembly, a plurality of openings in said cup-shaped members, said contacts having raised portions extending outwardly through said openings, said key being positioned in said slot to align the openings in said cup-shaped member with the raised portion of said contact members, a spacer carried by said post, a spring member on said spacer, contact members carried by said spring and electrically insulated therefrom, said contact members being disposed in physical contact with said first-mentioned contacts, and terminals carried by said spring and electrically insulated therefrom, said terminals being electrically connected to said spring supported contacts and adapted to be permanently connected to a wiring harness.

6. A thermocouple comprising a probe adapted to be disposed through a wall of a gas duct, thermocouple wires disposed in said probe and supported in insulated relationship with respect to said probe, said wires being joined to each other within said probe, a shell assembly comprising a cup shaped member supported upon said probe and having an upstanding post thereon, an electrical contact on each of said wires, an insulator having an opening therein through which said wires extend, said insulator being disposed in said shell assembly between said contacts and said probe and forming a seat for said contacts, a slot in a rim of said insulator, a second insulator disposed in said shell assembly having openings therein presenting side walls which grip said contacts to position said contacts in a predetermined position in said assembly, said second insulator having a rim having a slot therein, a key carried by said cup member and disposed in said slots, openings in said cup member, said contacts having raised portions extending outwardly through said openings, said key being disposed in said slots to align said contacts with said openings in said second insulator and said cup shaped member, a spacer carried by said post, a spring carried by said spacer, electrical contacts on said spring in physical contact with said first mentioned contacts, electric terminals connected to said spring supported contacts and adapted to be connected to a wiring harness, a cover on said post having an opening through which said harness may extend, and a slot in said cover cooperating with said key to position said opening in its proper position in the assembly.

7. A thermocouple comprising a probe adapted to be disposed through a wall of a gas duct, thermocouple wires disposed in said probe and supported in insulated relationship with respect to said probe, said wires being joined to each other within said probe, a shell assembly comprising a cup shaped member having a base and a depending rim on said base, an upstanding post on said base, a series of openings in said base, a key fixed to said depending rim and extending both inwardly and outwardly from said rim, said shell assembly being fixed to said probe, a first insulator in said shell assembly having an opening through which said wires extend, electrical contacts fixed to said wires, said insulator being disposed between said contacts and said probe and forming a seat for said contacts, a rim on said insulator having a slot therein, a second insulator having openings therethrough the side walls of which grip said contacts to retain said contacts in a predetermined position in the shell assembly, said second insulator having a rim with a slot therein, openings in said base of said shell assembly, said contacts having raised portions extending outwardly through said last-mentioned openings, said key being fitted into the slots in the rims of said insulators to align the openings in said second insulator with the openings in the base of said shell assembly, a spacer carried by said post and movable with respect to said post, a spring supported on said spacer, contacts carried by said spring and disposed in physical contact with said first-mentioned contacts, terminals carried by said spring and electrically connected to said spring carried contacts and adapted to be secured to a wiring harness, a cover carried by said spacer member, said cover being cup shaped and having a base with a downwardly depending skirt thereon, an opening in said cover through which said wiring harness may extend, a slot in said cover skirt cooperating with said key to position said cover opening in a predetermined position with respect to said terminals, and means for retaining said spacer on said post to tension said spring with a predetermined tension.

8. A thermocouple comprising an outer probe adapted to be subjected to heated gases, openings in said probe for permitting heated gas to pass therethrough, thermocouple wires disposed in said probe and supported in insulated relationship with respect to said probe, said wires being joined to each other within said probe, a shell assembly comprising a cup shaped member having an upstanding post thereon and secured to said probe, a first set of contact members comprising an electrical contact secured respectively to each of said wires and extending outwardly through said shell assembly, a spacer member carried by said post, a spring carried by said spacer member, a second set of electrical contacts carried by said spring, one each of said second set of contacts being disposed, respectively, in physical contact with one of said first set of electrical contacts, and terminal members carried by said spring electrically connected to one each of said second set of electrical contacts and adapted to be connected to a wiring harness.

9. A thermocouple comprising an outer probe adapted to be subjected to heated gas, openings in said probe for permitting heated gas to pass therethrough, a set of thermocouple wires disposed in said probe and joined to each other, a shell assembly comprising a cup shaped member secured to said probe and having an upstanding post thereon, a first set of contact members comprising an electrical contact connected, respectively, to each of said wires and extending outwardly through said shell assembly, a spacer member carried by said post, a spring carried by said spacer member, a second set of contacts carried by said spring, one each of said second set of contacts being disposed, respectively in physical contact with one of said first set of electrical contacts, terminal members carried by said spring, said terminal members being electrically connected, respectively, to one of said second set of electrical contacts and adapted to be connected to a wiring harness, means for retaining said spacer member in assembled relationship on said post, said spacer member being effective to pre-tension said spring to a predetermined amount when said retaining means is applied to said post.

10. A thermocouple comprising a probe adapted to be subjected to heated gas, openings in said probe for permitting heated gas to pass therethrough, thermocouple wires disposed in said probe and supported in insulated relationship to said probe, said wires being joined to each other in said probe, a shell assembly comprising a cup-shaped member having a boss and an upstanding post thereon, said shell assembly being mounted on said probe, a first set of contact members electrically connected to said wires, respectively, supported in said shell assembly and extending outwardly through said shell assembly, a spacer sleeve carried by said post, a spring carried by said spacer sleeve, a second set of electrical contacts carried by said spring, one each of said second set of contacts being disposed in physical contact with one of said first set of electrical contacts, a terminal member on each of said second set of contacts adapted to be connected to a wiring harness, means for retaining said spacer sleeve on said post and in contact with said boss, said spacer sleeve being automatically effective to tension said spring with a predetermined tension when said spacer sleeve is disposed into contact with said boss.

No references cited.